US009275151B2

(12) United States Patent
Ghosh

(10) Patent No.: US 9,275,151 B2
(45) Date of Patent: Mar. 1, 2016

(54) SYSTEM AND METHOD FOR GENERATING A USER PROFILE

(75) Inventor: Riddhiman Ghosh, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1820 days.

(21) Appl. No.: 12/367,200

(22) Filed: Feb. 6, 2009

(65) Prior Publication Data

US 2010/0205211 A1    Aug. 12, 2010

(51) Int. Cl.
*G06F 17/30*    (2006.01)

(52) U.S. Cl.
CPC ............................... *G06F 17/30867* (2013.01)

(58) Field of Classification Search
USPC ......................................................... 707/705
See application file for complete search history.

(56) References Cited

U.S. PATENT DOCUMENTS

| 7,673,327 | B1* | 3/2010 | Polis | G06F 17/3089 |
| | | | | 713/151 |
| 7,908,647 | B1* | 3/2011 | Polis | G06F 17/30997 |
| | | | | 713/151 |
| 2002/0151321 | A1* | 10/2002 | Winchell et al. | 455/519 |
| 2003/0154180 | A1* | 8/2003 | Case et al. | 707/1 |
| 2008/0235005 | A1* | 9/2008 | Golan et al. | 704/9 |

OTHER PUBLICATIONS

Houben outlines techniques for explicit data sharing schemes to build user profiles. Houben, J., et. al., State of the art: semantic interoperability for distributed user profiles, Telematica Institute Report, 2005.

* cited by examiner

*Primary Examiner* — Jay Morrison
(74) *Attorney, Agent, or Firm* — Trop, Pruner & Hu, P.C.

(57) ABSTRACT

A system and method is disclosed for generating a user profile. The method discloses: receiving a user profile request from a profile requester; identifying profile fragments with a profile mediator, from existing profiles in a profile corpus which are responsive to the user profile request; aggregating the identified profile fragments into the user profile response; and transmitting the user profile response to the profile requestor. The system discloses various means and modules for effecting the method.

18 Claims, 3 Drawing Sheets

SYSTEM AND METHOD FOR GENERATING A USER PROFILE

BACKGROUND OF THE INVENTION

1. Field of the Invention

The present invention relates generally to systems and methods for generating user profiles.

2. Discussion of Background Art

A user profile, used in service personalization, is a structured construct containing information both directly and indirectly pertaining to a user's preferences, behavior, and context. Since personalization of services, content and user interactions is seen as key to a superior customer experience, it is important for service providers to build and maintain accurate models of a customer's preferences, interests and background through a user profile.

In doing so, however, several problems need to be confronted.

First, there is a lack of rich user profile information. Typical user profiles, such as those used by services on the web, are unable to capture rich information about a user. A profile is not merely a weighted vector of 'interest' keywords, rather it needs to capture user context, behavior and domain-relevant associations between the constituents of a profile. Current user profiling systems can be said to be of two general types: questionnaire-based profiling systems (i.e. asserted profile systems), and inference-based profile systems.

In questionnaire-based systems, users assert facts about themselves through questionnaire-based schemes. The service asks the user what it thinks are pertinent questions, and the answers to these questions are used to build a user profile. This approach, however, has several disadvantages: One, users may not enter complete information. Two, they might have already entered the requested information at other services and may not like to repeat themselves. Three, information needed for personalization is often orthogonal or contextual in nature to the service or interaction at hand. This information either lies elsewhere, or was not anticipated when the questionnaire was designed.

With inference-based profile systems, the system attempts to infer information about a user, for instance by analyzing user clickstreams, or mining user behavior, interaction or navigation patterns. However a service analyzing the interactions of a user with only itself is prone to make erroneous or very limited inferences.

A second problem that needs to be confronted is the new service spareness problem. When a user interacts with a new service for the first few times, there is a limited interaction history and the new service has a very sparse information model about the user. This may be because the number of user interactions with the new service is too small for an inferred profile to be generated, and usually asserted profile information is not enough. As a result, the sparseness profile problem encountered by new services tend to prevent effective personalization.

Some approaches attempt to address some of these problems using domain-specific data sharing agreements. In these schemes explicit data sharing agreements or schemes are in place between two or more parties to construct user profiles. The disadvantage with this approach is that manual or explicit point-to-point data sharing schemes and agreements need to already be in place between the different services so that data sharing can occur.

In response to the concerns discussed above, what is needed is a system and method for generating a user profile that overcomes the problems of the prior art.

BRIEF DESCRIPTION OF THE DRAWINGS

Some embodiments of the invention are described, by way of example, with respect to the following figures.

DETAILED DESCRIPTION OF THE PREFERRED EMBODIMENT

Figure 1:
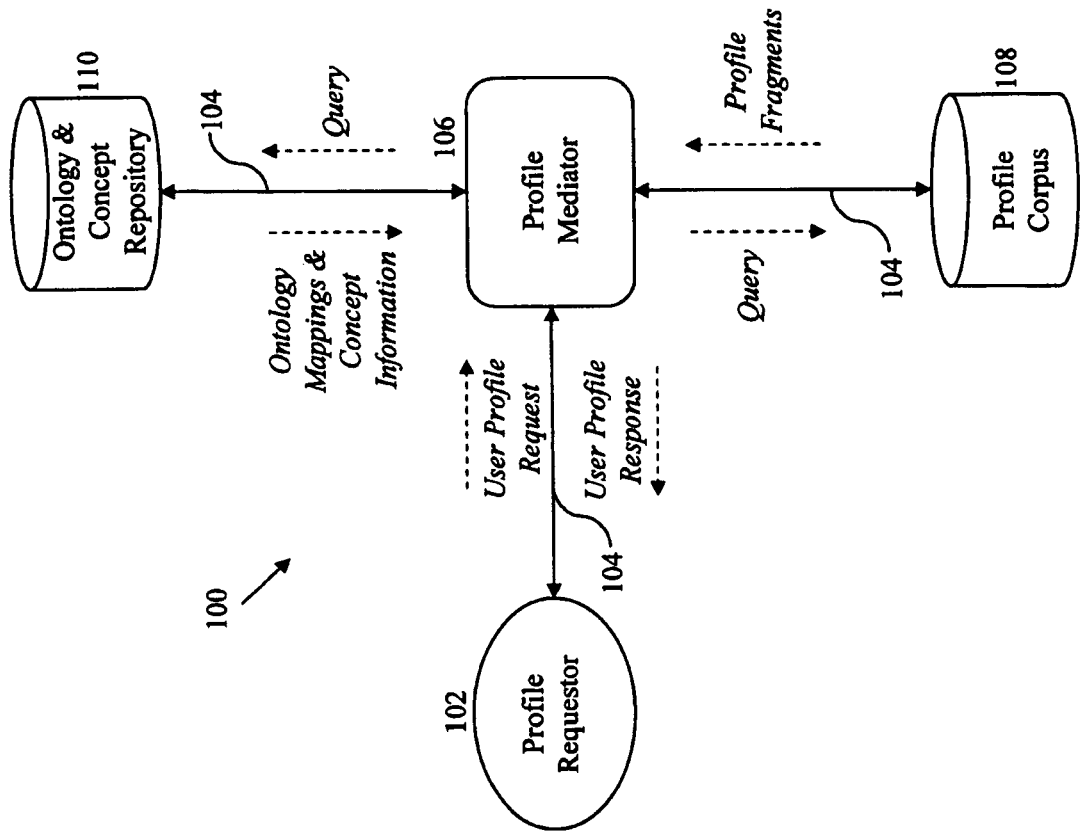
FIG. 1 is a dataflow diagram of one embodiment of a system for generating a user profile.

The present invention describes a method for generating a user profile from suitable fragments of an existing set of profiles and profile-relevant data, in response to a profile request. The existing set of profiles becomes available either as a user of the present invention interacts with other profile requesting entities (e.g. a service) or can be proactively built by an agent on behalf of the user. The present invention's use of existing profile fragments addresses both the lack of rich user profile information problem and the new service sparseness problems described in the background, without the need for domain-specific, multi-way data sharing agreements or any central ownership of the profile data.

The present invention enriches user profiles by using context sensitive "out-of-band" profile data (e.g. fragments of the user's interactions, preferences and behavior with other services, distributed perhaps across multiple services and touchpoints), which enables creation of a holistic view of a user. This is possible because of the increasing emergence of services that export their data through standard APIs.

For example, consider a retailer who would like to personalize offers and/or coupons for its customers. A large portion of the factors affecting a customer's purchase decisions occur outside the scope of a brick-and-mortar store or an online shopping website. This "out-of-band" information has a significant impact on what, when, and how customers buy, and includes the customers' social and life events, data from online calendars, online shopping lists and wish lists, customers' personal information management systems, social network recommendations etc.

This out-of-band information is diverse, typically cross-organizationally distributed, and with differing schemas and semantics hindering aggregation and reuse. However, the present invention includes techniques that incorporate the use of ontologies and concept repositories which significantly remedy such out-of-band information "babelization" (i.e. semantic variance of a proliferation of terms used to describe the same details about a user).

The present invention addresses the new service sparseness problem mentioned in the background by including a profile mediator which dynamically builds a user profile for a particular service or interaction, even though the user has not had a previous interaction history with the particular service, and even if there was not a data-sharing agreement between the particular service and the user's previous interaction history with other services, or the profile information those other services hold. Thus services that have little or no previous interaction history with a user will find it advantageous to use the present invention.

Thus the present invention's advantages include:
a. Dynamic Construction of User Profiles: Rather than static user profiles, the present invention allows for the dynamic creation of user profiles designed for a particular service or interaction in real-time;

b. Rich User Profile Information: The present invention augments current asserted or inferred profile systems by allowing for construction of user-profiles by using profile-relevant data available at other services through the automatic discovery of suitable profile fragments;

c. Explicit Data Sharing Agreements Are Not Required: The present invention does not need a priori explicit or manual data sharing agreements between multiple services; Suitable profile fragments are discovered using a combination of strategies that involve calculating the semantic distance between requested and available profile information, and using feedback from previous profile constructions to guide fulfillment of future requests; The different services involved need not even be aware of each other; and d. New Service Sparseness Issues Addressed: Services a user has no or only a limited interaction history with, will find it advantageous to use the present invention so as not to have to contend with extremely sparse user information models.

FIG. 1 is a dataflow diagram of one embodiment of a system 100 for generating a user profile. The system 100 includes a profile requestor 102, a network 104, a profile mediator 106, a profile corpus 108, and an ontology and concept repository 110.

The profile requestor 102 is an entity that needs to build or obtain a new or updated profile for the user, such as for personalization purposes. The profile requestor 102 may also be part of an entity that is interacting in some manner with or on behalf of a user. "User Profile" as used in the present specification is defined to include not only a profile for an individual user, but also a profile for any entity that can be profiled in some manner, including a business, a computer, and other web services. Also, while the profile requestor 102 is discussed as a web service provider in the present specification, those skilled in the art will recognize that the profile requestor 102 could be any entity, including an application program, a software agent, a computer, a retail or business entity, etc.

The profile requestor 102 sends a user profile request over the network 104 to the profile mediator 106. The user profile request identifies a set of information, which the profile requestor 102 needs to build and/or update the user's profile, in the form of a desired profile specification. The specification could be in the form of, or a combination of, one or more of the following: a desired ontology, or a desired sample profile with instance data from which an ontology can be inferred. The ontology or instance data could be represented in multiple formats, including using Resource Description Framework (RDF) triples. The network 104 as used in the present specification is defined to include communication architectures within a single application, a single computer, and a single organizational entity (e.g. a business), as well as between multiple applications, computers, and organizational entities (e.g. over the web).

The profile mediator 106 receives the user profile request from the profile requestor 102, and then generates a user profile response. In constructing the user profile response, the profile mediator 106 effects one or more different approaches for identifying profile fragments which are responsive to the user profile request. While it is possible that each of the following approaches to be discussed may either individually or together be able to wholly satisfy the user profile request; it is possible that each approach will yield only a subset of relevant profile fragments which, even when combined, will not completely satisfy the user profile request. In such cases, the profile mediator 106 will aggregate those profile fragments that have been identified as responsive to the user profile request into the user profile response which is then transmitted over the network 104 to the profile requestor 102. If the profile requestor 102 receives a user profile response which only partially satisfies the user profile request, then the profile requestor 102 may gather supplemental information from other sources, such as directly from the user, in order to fully satisfy the user profile request. Each of the approaches for identifying profile fragments is described infra. These approaches may be effected by the profile mediator 106 either serially or in parallel.

In a first approach, the profile mediator 106 queries the profile corpus 108 for any existing profiles conforming to the profile specification (e.g. sample profile or ontology) contained in the user profile request. This can be considered a "discovery-by-example" type approach for generating the user profile response. The profile corpus 108 is preferably comprised of a user-owned and user-controlled collection of the user's profiles, as created and maintained by different services. By way of example, such user profiles may include: the user's FaceBook™ profile, the user's profile on eVite™ or Amazon™, as well as the user's other profile-relevant information such as Microsoft Outlook™ calendar events information or the user's Friend-Of-A-Friend (FOAF) social network and personal profile, etc. User-driven aggregation tools and/or agents are used to build the profile corpus 108. Profile information stored in the profile corpus 108 is preferably associated with explicit or inferred domain ontologies, corresponding to existing well-known ontologies such as FOAF, and an explicit set of semantics (e.g. using standards from the Semantic Web such as the Web Ontology Language (OWL), RDF, or their variants).

The profile mediator 106 then assembles a set of profile fragments corresponding to the user profile request, which were identified from the existing profiles in the profile corpus 108, into the user profile response. The user profile response is then transmitted over the network 104 to the profile requestor 102.

In a second approach, the profile mediator 106 searches the ontology and concept repository 110 for any well-known ontology mapping information between the profile specification contained in the user profile request provided by the profile requestor 102 and existing ontologies and/or profiles stored in the profile corpus 108. The ontology and concept repository 110 stores or can referentially access well-known ontology mappings (e.g. the Swoogler™ Ontology repository), as well as concept databases such as Wikipedia™ or the Wordnet™ lexical database. The availability of these mappings and concepts helps mitigate the heterogeneity (i.e. "babelization") of terms between those in the user profile request and/or stored in the profile corpus 108.

If a well-known ontology mapping is found, then the profile mediator 106 uses the mapping to extract selected user profile information fragments from the profile corpus 108, thereby generating the user profile response which is then sent to the profile requestor 102 over the network 104. Note that profile information, fragments, and ontologies, can be represented using a variety of different data modeling languages, including: RDF, XML, or a non-standard language.

In a third approach, if a well-known ontology mapping can not be found in the ontology and concept repository 110, the profile mediator 106 selectively accesses concepts from the ontology and concept repository 110 to help calculate a semantic distance between the profile specification contained in the user profile request provided by the profile requester 102 and the constituents (e.g. encoded in RDF, XML or another data modeling language) of the profiles and their associated ontologies in the profile corpus 108. The profile mediator 106 then selects those fragments from the profile corpus 108 which are within a threshold semantic distance from similar constituents of the profile specification contained within the user profile request, to construct the user profile response. Those skilled in the art will know a variety of techniques for calculating semantic distance. The threshold is preferably set to a value identified when the system 100 is groundtruthed with a known set of data. The threshold may then be offset on a case by case basis if requested by the profile requestor 102.

In a fourth approach, the profile mediator 106 recalls any previous interactions which the profile mediator 106 had with the profile requestor 102 that involved a same or very similar user profile request. These previous interactions may include feedback from the profile requester 102 on profiles previously sent to the profile requestor 102 by the profile mediator 106. Such feedback is preferably used to train the profile mediator 106 how to respond to future user profile requests. The profile mediator 106 then generates the user profile response based on information learned from the previous interactions. The profile mediator 106 then sends the user profile response to the profile requester 102 over the network 104.

The profile mediator 106 thus dynamically constructs the user profile response by choosing suitable fragments of existing profiles, based on the user profile request given by the profile requestor 102.

The profile mediator 106 can, in an alternate embodiment, also be configured to permit a user to affect different 'personas' while interacting with the profile requestor 102, thereby enabling users to better control what information about them is revealed from the profile corpus 108 to the profile requestor 102.

Figure 2:
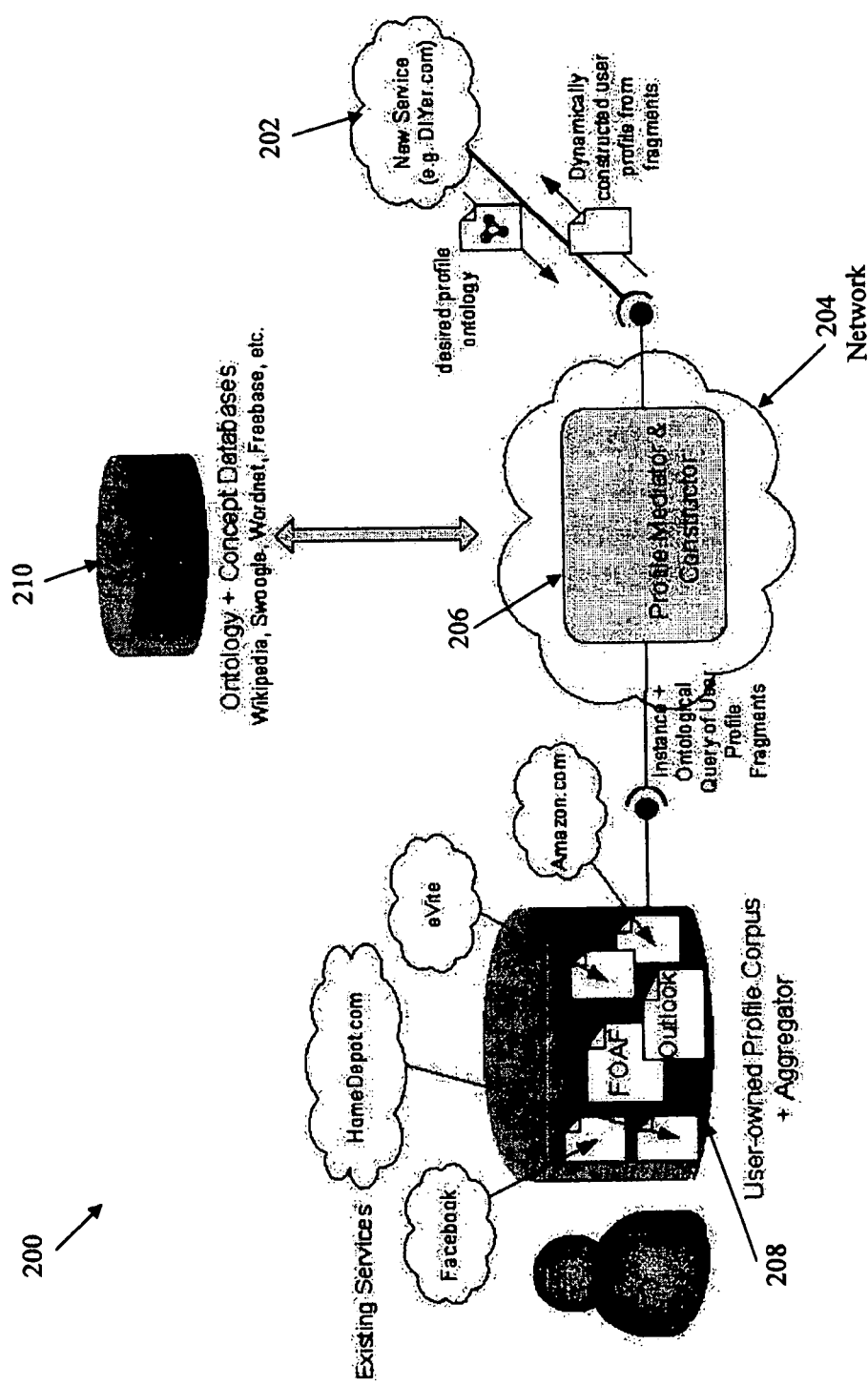
FIG. 2 is an example embodiment of the system for generating a user profile.

FIG. 2 is an example embodiment 200 of the system 100 for generating a user profile. Here, a user's profile corpus 208 may contain a Facebook.com™ profile, a HomeDepot.com™ profile, an eViter™ profile, and an Amazon.com™ profile. If a new do-it-yourself web site, say DIYer.com™ 202, needs to build a user profile, the profile mediator 206 will as necessary access the profile corpus 208 of the user and the ontology and concept database 210, over the network 204. The profile mediator 206 will detect that the user's HomeDepot.com™ profile, within the profile corpus 208, is the most relevant (e.g. within a threshold semantic distance). The profile mediator 206 will also determine that perhaps only a subset (i.e. fragment) of the user's profile pertaining to do-it-yourself books or purchases on the user's Amazon.com™ profile are relevant, but not information in the user's Facebook.com™ profile. The profile mediator 206 will then dynamically construct a user profile for use by DIYer.com™ 202 for customizing the user's experience with DIYer.com™ 202. Such new profile construction is made possible by the present invention even though the user has not had a previous interaction history with DIYer.com™ 202, and even if there was not a data-sharing agreement between HomeDepot.com™, Amazon.com™, Facebook.com™, and DIYer.com™ 202.

Figure 3:
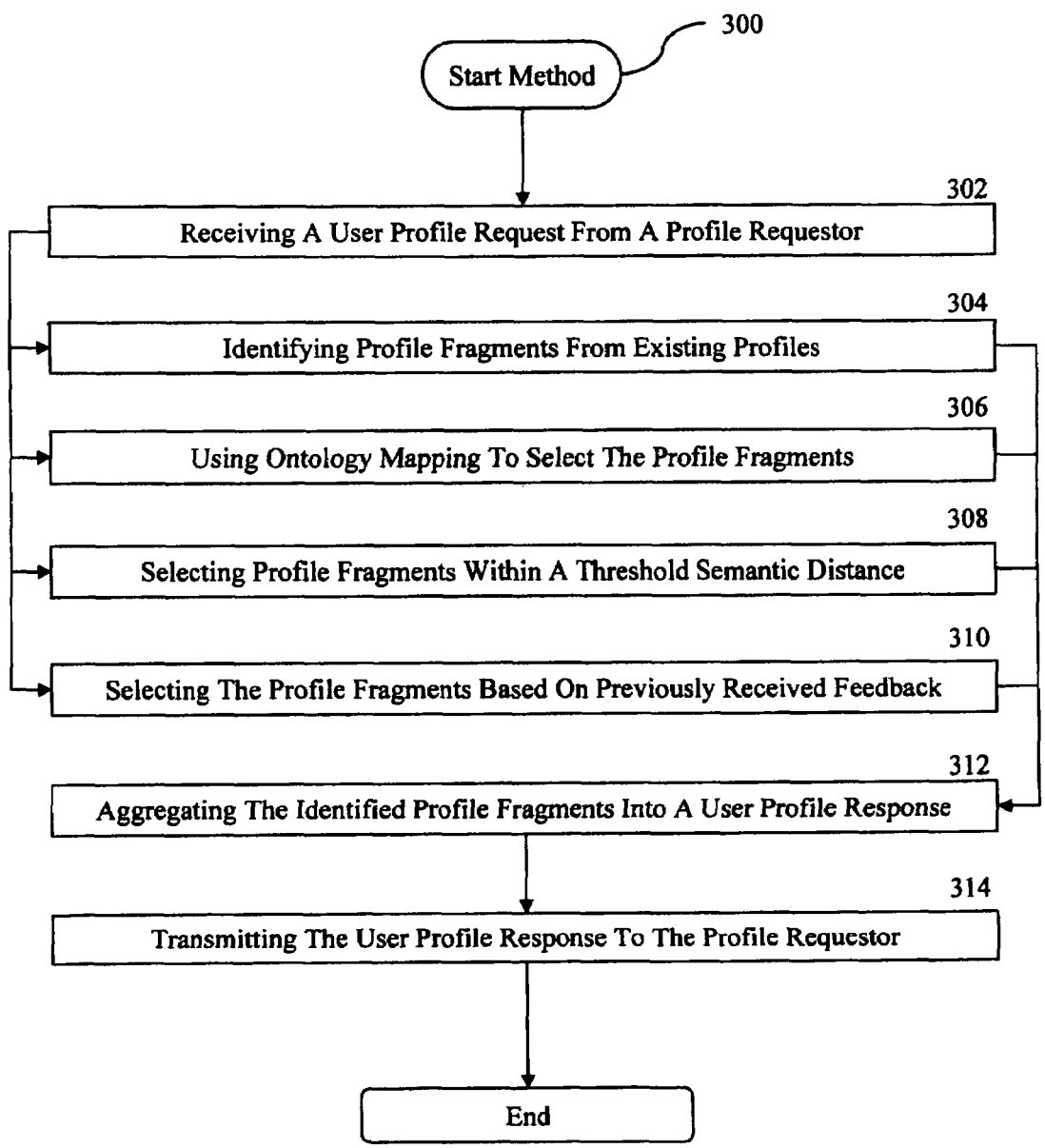
FIG. 3 is a flowchart of one embodiment of a method for generating a user profile.

FIG. 3 is a flowchart of one embodiment of a method 300 for generating a user profile response. The method steps now discussed are to be understood within a context provided by this and other portions of this detailed description. Those skilled in the art will recognize that while one embodiment of the present invention's method is now discussed, the material in this specification can be combined in a variety of ways to yield other embodiments as well.

The method 300 begins in step 302, when the profile mediator 106 receives a user profile request from the profile requestor 102. The user profile request includes a desired profile specification. The specification could be in the form of, or a combination of, one or more of the following: a desired ontology, or a desired sample profile with instance data from which an ontology can be inferred. The ontology or instance data could be represented in multiple formats, including using Resource Description Framework (RDF) triples. The profile requestor 102 can be embodied in a variety of entities including: an application program, a software agent, a computer, and a business entity.

Four techniques/approaches used by the profile mediator 106, for identifying profile fragments to be included in the user profile response, are now discussed. Each approach may be executed individually, serially, or in parallel depending upon an embodiment of the present invention. While these approaches are actually independent and by themselves should be able to help generate the user profile response, in another embodiment these four different approaches could be combined (i.e. adopting a multi-expert approach), wherein each of the different approaches is treated as a specialized expert and the results from these experts are then suitably weighted and aggregated to generate the user profile response. Preferably each of the approaches are used in some capacity in response to the user profile request.

Step 304 presents a first identifying approach. In step 304, the profile mediator 106 identifies profile fragments, from existing profiles in the profile corpus 108 which are responsive to the user profile request. The profile corpus 108 includes a user-controlled collection of user profiles based on user interactions with a different set of profile requesters, such as those the user has interacted with in the past. The profile fragments stored in the profile corpus 108 represent information about various users, such as: an individual, a business, a computer, an application, or a web service. Profile fragments stored in the profile corpus 108 are preferably associated with explicit or inferred domain ontologies, corresponding to existing well-known ontologies such as FOAF, and an explicit set of semantics (e.g. using standards from the Semantic Web such as the Web Ontology Language (OWL), RDF, or their variants).

Step 306 presents a second identifying approach. In step 306, the profile mediator 106 identifies an existing ontology mapping, stored in the ontology and concept repository 110, between the profile specification contained in the user profile request and the existing profiles in the profile corpus 108. The profile mediator 106 uses the mapping to identify and extract the profile fragments.

Step 308 presents a third identifying approach. In step 308, the profile mediator 106 calculates a semantic distance between the profile specification contained in the user profile request provided by the profile requestor 102 and the constituents of the profiles and their associated ontologies in the profile corpus 108. The profile mediator 106 then selects those profile fragments from the existing profiles which are within a threshold semantic distance from the profile fragments in the user profile request. The profile mediator 106 may update the threshold as desired by the profile requester 102.

Step 310 presents a fourth identifying approach. The profile mediator 106 receives feedback from the profile requestor 102 based on previous user profile responses sent to the profile requestor 102. The profile mediator 106 uses the feedback, in step 310, to train the profile mediator's 106 use of the different identifying approaches, discussed above. The profile mediator 106 then selects the profile fragments based on the training.

In step 312, the profile mediator 106 aggregates the identified profile fragments into the user profile response. The profile mediator 106 permits the user to selectively filter which profile is, or which of the profile fragments are, included in the user profile response based on a user selected persona.

In step 314, the profile mediator 106 transmitting the user profile response to the profile requester.

Instructions of software described above are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. A method executed by a computer for generating a user profile response, comprising:
   receiving a request from a profile requestor to create or to modify a profile for a particular user;
   identifying profile fragments from existing profiles for the particular user that are contained in a profile corpus, the identified profile fragments responsive to the request;
   aggregating the identified profile fragments into the user profile response; and
   transmitting the user profile response to the profile requestor.

2. The method of claim 1:
   wherein the request includes one from a group of: a profile specification, a sample profile, an ontology, and instance data from which an ontology can be inferred.

3. The method of claim 1:
   wherein the profile requestor is one from a group including: an application program, a software agent, a computer, and a business entity.

4. The method of claim 1, further comprising:
   generating the existing profiles contained in the profile corpus by one from a group including:
   acquiring a profile from a service;
   creating a profile based on an interaction with a service; and
   maintaining a profile in cooperation with a service.

5. The method of claim 1:
   wherein the profile fragments include information about one from a group of: an individual, a business, a computer, an application, and a web service.

6. The method of claim 1:
   wherein the profile fragments include one from a group of: a set of explicit domain ontologies, a set of inferred domain ontologies, and a set of semantics.

7. The method of claim 1, wherein identifying includes:
   identifying an existing ontology mapping, stored in an ontology and concept repository, between the request and the existing profiles; and
   using the mapping to select the profile fragments.

8. The method of claim 1, wherein identifying includes:
   calculating a semantic distance between profile fragments in the existing profiles and a profile specification in the request; and
   selecting those profile fragments from the existing profiles which are within a threshold semantic distance from the profile specification in the user profile request.

9. The method of claim 8, further comprising:
   updating the threshold based on information received from the profile requestor.

10. The method of claim 1, wherein identifying includes:
    receiving feedback from the profile requestor based on previous user profile responses sent to the profile requestor;
    using the feedback to train a profile mediator; and
    selecting the profile fragments based on the training.

11. The method of claim 1, wherein identifying includes:
    identifying profile fragments according to a set of different approaches executed in parallel; and
    wherein the fragments of each approach are compared and selected using multi-expert techniques.

12. The method of claim 1, wherein identifying includes:
    identifying profile fragments using a semantic distance computed using an ontology and concept repository.

13. The method of claim 1, further comprising:
    filtering which of the profile fragments are included in the user profile response based on a user-selected persona.

14. An article comprising at least one computer-readable storage medium containing instructions that when executed cause a computer to:
    receive a request from a profile requestor to create or to modify a profile for a particular user;
    identify profile fragments with a profile mediator, from existing profiles for the particular user in a profile corpus, wherein the identified profile fragments are responsive to the request;
    aggregate the identified profile fragments into a user profile response; and
    transmit the user profile response to the profile requestor.

15. A system for generating a user profile response, comprising:
    a processor configured to operate a series of modules, wherein the modules comprise:
    a profile corpus to store a plurality of existing user profiles for a particular user;
    a profile mediator configured to:
    receive a user profile request from a profile requestor, the user profile request being a request for the profile mediator to create a new profile for the particular user or to modify one of the plurality of existing user profiles;

identify profile fragments from the plurality of existing user profiles in the profile corpus, the identified profile fragments responsive to the user profile request;

aggregate the identified profile fragments into the user profile response; and transmit the user profile response to the profile requestor.

16. The system of claim 15, wherein the profile mediator is further configured to:

calculate a semantic distance between profile fragments in the plurality of existing user profiles and a profile specification in the user profile request; and select those profile fragments from the plurality of existing user profiles which are within a threshold semantic distance from the profile specification in the user profile request.

17. The system of claim 15, further comprising:

an ontology and concept repository; and wherein the profile mediator is further configured to:

identifying an existing ontology mapping, stored in the ontology and concept repository, between the user profile request and the plurality of existing user profiles; and using the mapping to select the profile fragments.

18. The system of claim 15 wherein the plurality of existing user profiles stored in the profile corpus are from a plurality of web-based service providers that do not have a data-sharing agreement there between.

* * * * *